Oct. 11, 1960     F. W. BROWN     2,955,361
RANGE AND BEARING COMPUTER FOR RADAR SIMULATOR
Filed Oct. 30, 1956     3 Sheets-Sheet 1

$\Theta$ = TARGET BEARING
R = TARGET RANGE (1) $Y \cos \Theta - X \sin \Theta = 0$
(2) $R = X \cos \Theta + Y \sin \Theta$    WHEN $\Theta_{ANTENNA} = \Theta_{TARGET}$

*INVENTOR.*
FORREST W. BROWN
BY *Erwin B. Steinberg*
     *agent*

INVENTOR.
FORREST W. BROWN

United States Patent Office 2,955,361
Patented Oct. 11, 1960

2,955,361

RANGE AND BEARING COMPUTER FOR RADAR SIMULATOR

Forrest W. Brown, New Canaan, Conn., assignor to The Reflectone Corporation, Stamford, Conn., a corporation of Connecticut Filed Oct. 30, 1956, Ser. No. 619,211

7 Claims. (Cl. 35—10.4)

This invention refers to a range and bearing computer and has particular reference to range and bearing computing mechanisms for radar simulators.

Radar simulators are well known in the art having been used for many years in connection with training and simulation purposes. Most of the radar trainers simulate a plurality of targets sometimes 12, 30 or as many as 96 targets. In general, a target course generating device is employed to generate the motion of each individual target and the output from each target generator is then applied to electronic equipment which converts the instantaneous target position from the target generator into signals for reproduction on the conventional radar display oscilloscope (P.P.I. indicator). The present invention is restricted to that portion of the electrical circuit which computes the range and bearing information as a function of the output from the target course generaing device and the setting of the simulated antenna scan.

In the prior devices of this type, range and bearing information is obtained by comparing the antenna bearing with the target bearing and permitting a radar display of the target when the antenna bearing information and target bearing information are coinciding. This requires the use of an electrical or electromechanical resolver for each target. It will be apparent when thirty or more targets are simulated on an indicating scope the equipment becomes very complex, bulky and expensive.

One of the objects of this invention therefore is to provide a range and bearing computer which avoids one or more of the disadvantages of the prior art.

Another object of this invention is the provision of a range and bearing computer which employs but a single resolving device for a plurality of targets.

Another object of this invention is the provision of a computer which cyclically provides a range signal but that signal is at the correct value only when a corresponding bearing signal is at the correct value.

A further object of this invention is the provision of a range and bearing computing mechanism which is devoid of servo mechanisms.

A further and other object of this invention is the provision of a range and bearing computing mechanism which employs a minimum number of components thereby achieving utmost simplicity for a plurality of targets.

Still further and other objects of this invention will be apparent by reference to the following drawings in which.

Figure 1:
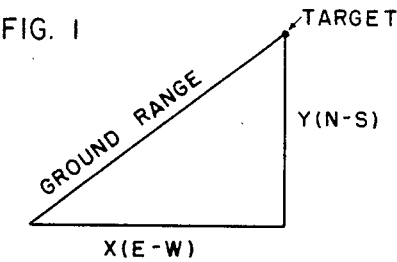
Figure 1 is a schematic vector diagram of the geometric relations of a target with respect to the observation point.

Referring now to Figure 1, a target is shown having X and Y Cartesian coordinates with respect to the center of a coordinate system. The center of the coordinate system is the position of the radar antenna and also the center of the P.P.I. scope. It will be observed that the hypothenuse of the diagram represents ground range.

Figure 2:
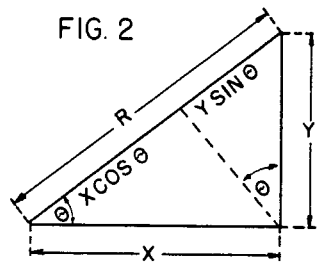
Figure 2 is another vector diagram of the target position, defining the mathematical relations as a function of bearing angle in a rectilinear coordinate system.

In Figure 2 the geometric relations of the target with respect to the antenna are shown, wherein the angle $\Theta$ represents the target bearing and distance R the target range. It will be apparent that the Equations 1 and 2 apply only when the angle $\Theta$ representing antenna bearing is equal to angle $\Theta$ representing target bearing. It should be noted carefully that for all other conditions Equations 1 and 2 do not apply. The derivation of Equation 1 is shown by the following:

$$Y/R = \sin \Theta$$
$$X/R = \cos \Theta$$
$$R = Y/\sin \Theta$$
$$R = X/\cos \Theta$$
$$Y/\sin \Theta = X/\cos \Theta$$
$$Y \cos \Theta = X \sin \Theta$$
$$Y \cos \Theta - X \sin \Theta = \text{zero}$$

The embodiment of the mathematical relations shown above is illustrated in Figure 3 wherein numeral 11 represents a two-phase conventional electrical resolver whose rotor is supplied with an A.-C. input signal. The resolver is supplied also with mechanical position information by means of motor 12 which simulates the scan rate and bearing (angle $\Theta$) of the antenna. The output of the resolver, usually taken off the stator of the resolver, comprises two signals, namely input voltage times the sine of the angle $\Theta$ and identified by conductor numeral 13 and the input signal times the cosine of the angle $\Theta$, conductor 14. The sine signal is applied to the input terminals of a pair of multiplying devices such as a potentiometer 15 and a potentiometer 16, whereas the cosine signal is applied to two similar units 17 and 18 respectively. Numeral 19 identifies a moving target generating device such as described in Patent No. 2,664,754, dated January 5, 1954, issued to F. W. Brown; Patent No. 2,671,612, dated March 9, 1954, issued to A. A. Coster; or Patent No. 2,669,033, dated February 16, 1954, issued to F. W. Brown. Such a target course generator is an analog computing device which generates the motion of a target in two dimensions and produces two output shaft rotations by resolving a polar vector into its two Cartesian coordinates. The position of either output shaft at any given time represents the instantaneous position of the target generated along one of the rectilinear coordinates (X and Y coordinates).

Figure 3:
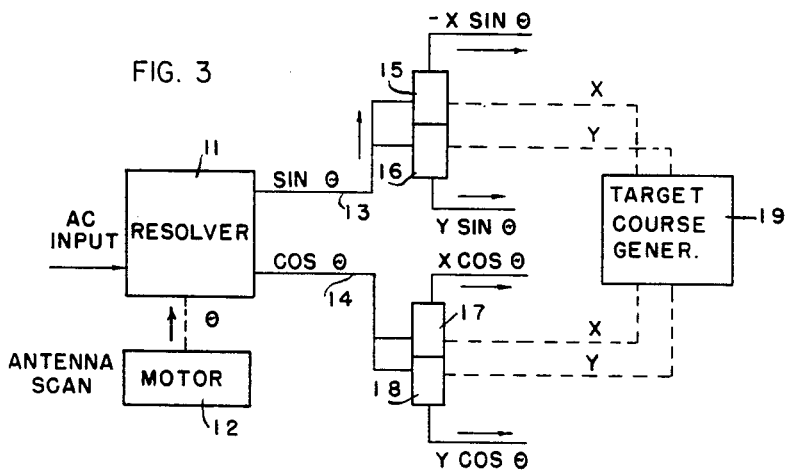
Figure 3 is a schematic circuit diagram, partially in block form, showing the principle of the computing mechanism.

In Figure 3 the X and Y target position outputs from the course generating device 19 are applied to the multiplying units 15, 16, 17, and 18 respectively in such a manner that the sine signal is multiplied by the X target position and also by the Y position, and in a similar manner the cosine signal is multiplied by the X and Y positions respectively. In a typical embodiment, the sliders of potentiometers 15 and 17 are positioned by the X output shaft of the target course generator 19 whereas the sliders of potentiometers 16 and 18 are driven by the Y output shaft.

The outputs from multiplying potentiometers 15 and 18 representing minus $x \sin \Theta$ and $y \cos \Theta$ are combined in adder 21 (Figure 4) and the outputs from multiplying units 17 and 16 are added in circuit 22. The resulting signal from circuit 21 is considered the bearing signal and the signal from adder circuit 22 represents the range signal with values corresponding to Equations 1 and 2 stated above.

It will be noted that the bearing signal from circuit 21 is a continuous signal which is responsive to the deviation between antenna bearing and target bearing. The amplitude of this signal will vary cyclically from a minimum to a maximum value as the antenna scan motor rotates. It will be observed however that the signal is only useful when it is at its minimum value, the deviation between antenna bearing and target bearing then being substantially zero. Conversely at this instant the range signal will be at its maximum value as is apparent from Figure 2 above.

Figure 4:
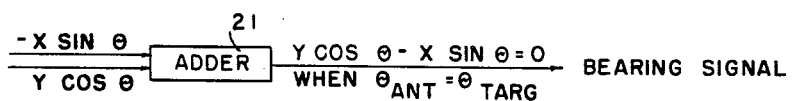
Figure 4 is a continuation of Figure 3, showing schematically the combining of signals.
Figure 4:
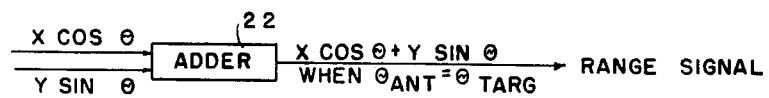
Figure 5:
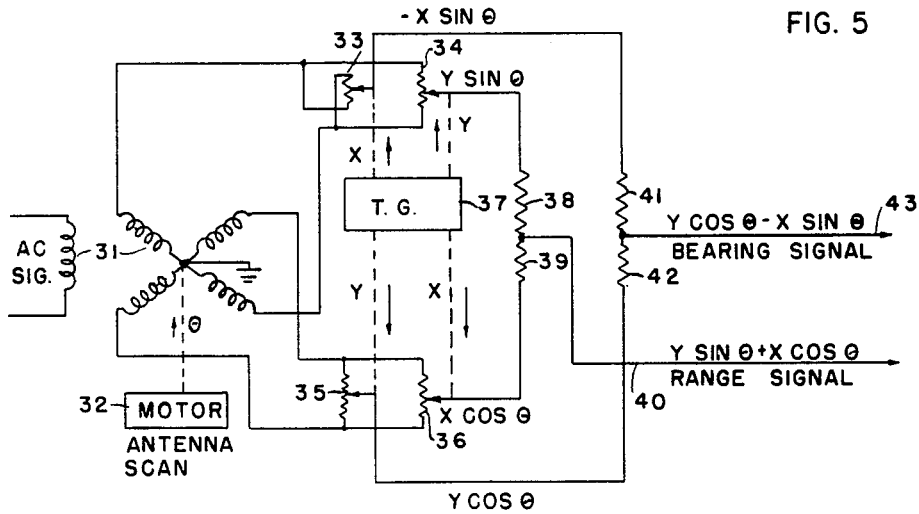
Figure 5 is a schematic electrical circuit diagram of the range and bearing computer for a single target.
Figure 6:
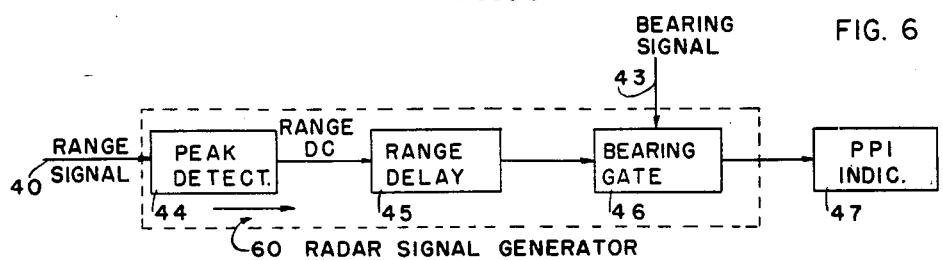
Figure 6 is a continuation of Figure 5 showing in block form some of the circuits employed after range and bearing signals have been developed.

With reference to Figures 5 and 6 a schematic circuit diagram is shown which embodies the circuits of Figures 3 and 4. A two-phase resolver 31 is shown whose rotor is positioned via the antenna scan motor 32. The midpoint of the resolving windings is grounded so that all signals in the following discussion are referenced with respect to ground. The sine output signal from the resolver is applied to the windings of potentiometers 33 and 34 connected in parallel and the cosine output to potentiometers 35 and 36. It will be observed that the winding of potentiometer 33 is reversed since a minus quantity is necessary for the sum which corresponds to the bearing signal. The mechanically adjustable sliders of potentiometers 33 and 36 are controlled by the X output shaft position of target course generator 37, whereas the sliders of potentiometers 34 and 35 are positioned from the Y output shaft of the target generator. Potentiometers 33, 34, 35, and 36 are usually 10-turn precision type potentiometers. The output from potentiometers 34 and 36 is combined in an adding network comprising two resistors 38 and 39 to produce the range signal appearing in conductor 40. The output of potentiometers 35 and 33 is combined in resistive network 41, 42 and the resultant output represents the bearing signal appearing in conductor 43. The range signal 40 is applied consecutively to a peak detecting circuit 44, a range delay circuit 45, and a bearing gate 46 which form a part of a conventional radar signal generator 60. The bearing signal 43 is also applied to the bearing gate 46 and a radar display signal to the radar indicating device 47 (P.P.I. indicator) is permitted only when the bearing signal is substantially zero because only then the correct solution is achieved as described hereinbefore.

The range signal being of sinusoidal shape passes through zero at two points during 360 degrees. However circuit arrangements allow gating at only the bearing voltage null point which is coincident with a positive range voltage.

Peak detecting circuits, range delay and bearing gate circuits and the P.P.I. indicating scope depicted here in block form are well known in the art of radar devices and radar simulators and may be inspected by referring to the prior art, such as "Radar System Engineering" (book) by L. N. Ridenour, M.I.T. Radiation Lab. Series, vol. 1, McGraw-Hill Company, New York, 1947, and associated volumes of this series.

Figure 7:
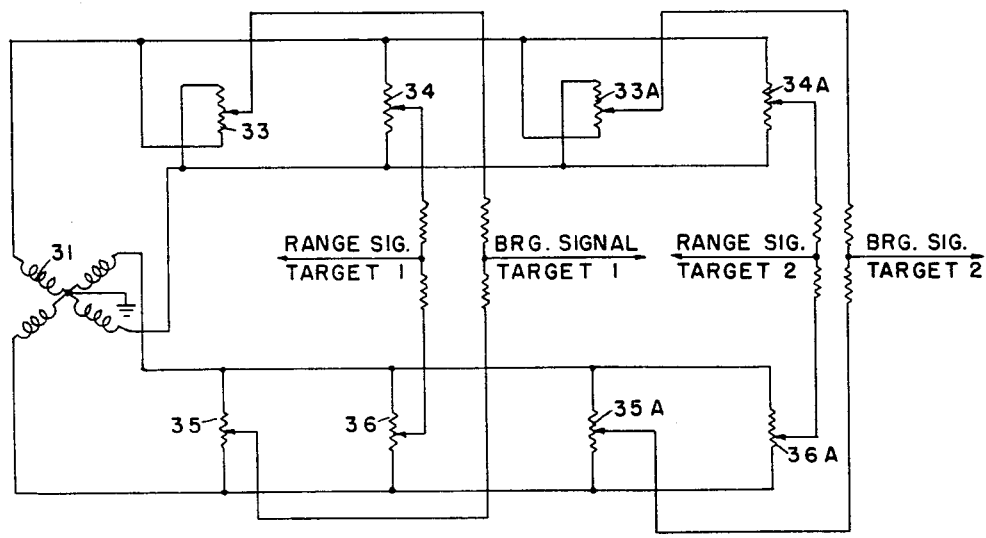
Figure 7 is a schematic electrical circuit diagram showing range and bearing computation for a plurality of targets.
Figure 8:
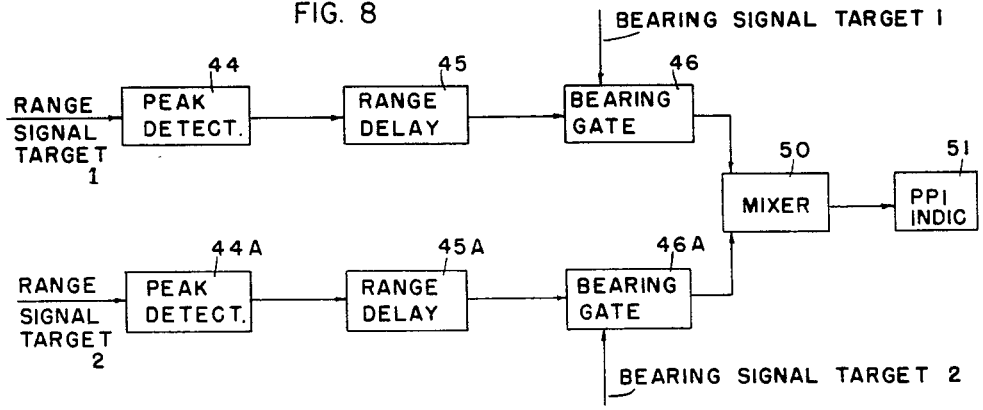
Figure 8 is a continuation of Figure 7 showing the circuits for two targets after obtaining computation of range and bearing signals.

Figures 7 and 8 depict the equivalent circuits of Figures 5 and 6 when a plurality of individual radar targets is employed. Only a single resolver 31 is used for a plurality of targets and whereas potentiometers 33, 34, 35, and 36 apply to a first target, potentiometers 33A, 34A, 35A, and 36A apply to a second target. In a similar manner one target generator 37 (Figure 5) will be required for each individual target so that potentiometers 33A, 34A, 35A, and 36A will be positioned by a target generator generating the course for the second target. In a similar manner peak detector circuit 44, range delay circuit 45 and bearing gate 46 apply to the first target, peak detector circuit 44A, range delay circuit 45A and bearing gate 46A to the second target. The signals of the first and second target are applied to a mixer circuit 50 and from there control the radar display on P.P.I. scope 51. It will be apparent that a further number of targets can be paralleled in an analogous manner.

Figure 9:
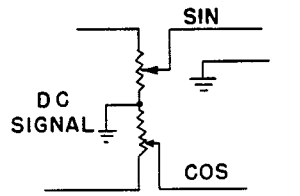
Figure 9 shows a schematic circuit diagram of a sine-cosine potentiometer which may be substituted in circuits of Figures 3, 5 and 7.

Figure 9 depicts a sine-cosine potentiometer which may be used to replace the electromagnetic resolver 31 (Figure 5). This type of potentiometer is available commercially and its design and characteristics are well known. In the event that such a potentiometer is used the input to the potentiometer is a D.-C. signal and all resultant voltages will be corresponding D.-C. signals thereby eliminating the need for a peak detector 44 (Figure 6).

It will be readily apparent to those skilled in the art that the two-phase resolver may be replaced by two single-phase resolvers whose rotors are positioned mechanically 90 degrees with respect to one another and whose input windings are connected in parallel, or that a three-phase resolver may be employed in combination with a Scott-type transformer to obtain conversion from a three-phase system to a two-phase system.

While there has been described a certain embodiment of the present invention, it will be understood by those skilled in the art that many variations and modifications may be made therein without departing from the principle and spirit of the invention which should be limited only by the scope of the appended claims.

What is claimed is:

1. In a radar simulator of the type described which includes a simulated antenna scan, the combination of means for generating an electrical signal; means resolving said signal into two rectangular coordinates as a function of antenna scan angle; means generating the rectangular coordinate target positions of a simulated target relative to said antenna; means modifying each of said resolved signals in accordance with one of said target position coordinates thereby producing four output signals, means combining said output signals into two signals one of which indicating range of the target from the antenna and the other signal indicating bearing deviation between said antenna and said target; and means causing a display of said target when said range signal is at its maximum amplitude and said bearing deviation signal is at its minimum value.

2. In a radar simulator of the type described which includes a simulated antenna scan, the combination of means for generating an electrical signal; electromagnetic means resolving said signal into two rectangular coordinates; means adjusting said electromagnetic means in accordance with the antenna scan angle; means generating the rectangular coordinate target positions of a simulated target relative to said antenna; multiplying means modifying each of said resolved signals in accordance with one of said target position coordinates thereby producing four output signals; means combining said output signals into two signals one of which indicating range of the target from the antenna and the other signal indicating bearing deviation between said antenna and said target; and means causing a display of said target when said range signal is at its maximum amplitude and said bearing deviation signal is at its minimum value.

3. In a radar simulator of the type described which includes a simulated antenna scan, the combination of means for generating an electrical signal; electromagnetic resolving means resolving said signal into two rectangular coordinates; means adjusting the angular position of said resolving means responsive to the antenna scan bearing; means generating the rectangular coordinate target positions of a simulated target relative to said antenna bearing; multiplying means modifying each of said resolved signals in accordance with one of said target position coordinates thereby producing four output signals; means combining said output signals into two signals one of which indicating range of the target from the antenna and the other signal indicating bearing deviation between said antenna and said target; and means causing a display of said target when said range signal is at its maximum amplitude and said bearing deviation signal is at its minimum value.

4. In a radar simulator of the type described which includes a simulated antenna scan, the combination of means for generating an electrical signal; electromagnetic resolving means resolving said signal into two rectangular coordinates; means adjusting the angular position of said resolving means responsive to the antenna scan bearing; means generating the rectangular coordinate target positions of a simulated target relative to said antenna bearing; variable impedance means modifying each of said resolved signals in accordance with one of said target position coordinates thereby producing four output signals; means combining said output signals into two signals one of which indicating range of the target from the antenna and the other signal indicating bearing deviation between said antenna and said target; and means causing a display of said target when said range signal is at its maximum amplitude and said bearing deviation signal is at its minimum value.

5. A radar simulator according to claim 4 wherein the variable impedance means comprises variable resistors whose sliders are positioned in response to the output from the target generating means.

6. In a radar simulator of the type described which includes a simulated antenna scan, the combination of means for generating an electrical signal; electromagnetic resolving means resolving said signal into two rectangular coordinates; means adjusting the angular position of said resolving means responsive to the antenna scan bearing; a plurality of means generating the rectangular coordinate target positions of simulated targets relative to said antenna bearing; a plurality of multiplying means modifying each of said resolved signals in accordance with one of said associated target position coordinates thereby producing four output signals for each target; means combining each set of four output signals into two signals one of which indicating range of the associated target from the antenna and the other signal indicating bearing deviation between said antenna and said associated target; and means causing a display of said target when the associated range signal is at its maximum amplitude and the associated bearing deviation signal is at its minimum value.

7. A device as set forth in claim 6 wherein said electromagnetic resolving means is a single resolving means.

References Cited in the file of this patent

UNITED STATES PATENTS

| | | |
|---|---|---|
| 2,399,661 | Bowie | May 7, 1946 |
| 2,471,315 | Dehmel | May 24, 1949 |
| 2,555,442 | Hales | June 5, 1951 |
| 2,597,895 | Novy | May 27, 1952 |
| 2,674,812 | Hales | Apr. 13, 1954 |
| 2,709,804 | Chance et al. | May 31, 1955 |
| 2,856,701 | Leskinen | Oct. 21, 1958 |

FOREIGN PATENTS

| | | |
|---|---|---|
| 748,623 | Great Britain | May 9, 1956 |

OTHER REFERENCES

Birtley: Electronics, September 1953, pages 137 to 139.